Feb. 25, 1941.     E. DODSON     2,233,307
MEANS FOR CONTROLLING AIRCRAFT ENGINES
Filed Nov. 29, 1939     4 Sheets-Sheet 1

Feb. 25, 1941.  E. DODSON  2,233,307
MEANS FOR CONTROLLING AIRCRAFT ENGINES
Filed Nov. 29, 1939  4 Sheets-Sheet 2
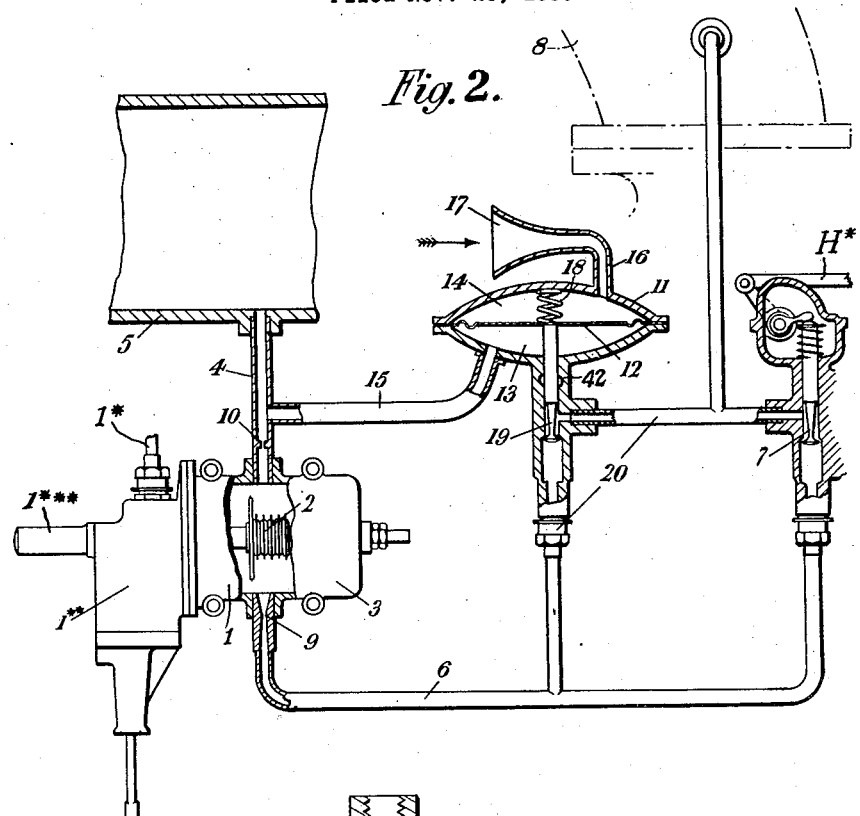
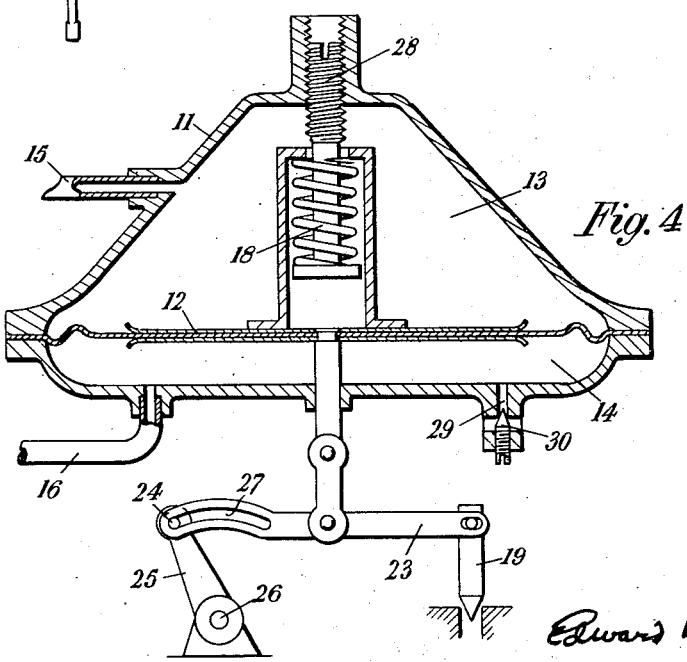

Feb. 25, 1941.  E. DODSON  2,233,307
MEANS FOR CONTROLLING AIRCRAFT ENGINES
Filed Nov. 29, 1939  4 Sheets-Sheet 3

Feb. 25, 1941.  E. DODSON  2,233,307
MEANS FOR CONTROLLING AIRCRAFT ENGINES
Filed Nov. 29, 1939  4 Sheets-Sheet 4

Patented Feb. 25, 1941

2,233,307

UNITED STATES PATENT OFFICE 2,233,307

MEANS FOR CONTROLLING AIRCRAFT ENGINES

Edward Dodson, London, England

Application November 29, 1939, Serial No. 306,751
In Great Britain December 10, 1938

8 Claims. (Cl. 123—119)

This invention relates to means for controlling supercharged or high compression ratio aircraft engines (hereinafter referred to as supercharged aircraft engines) in which the charging pressure is governed by a device known as a supercharge control device.

The invention is more particularly applicable for use in conjunction with the supercharge control device claimed and described in my United States Patent No. 1,995,800 in which means are provided for changing its datum with the movement of the throttle control, or with the supercharge control device claimed and described in my United States Patent No. 2,079,958 in which means are provided for changing the datum by the mixture control, preferably in a number of stages, as well as by the throttle control.

The power developed by an unsupercharged aircraft engine decreases with increase in altitude due to the decreasing density of the atmosphere. The function of the supercharger is to force air into the engine and thereby enable the engine to maintain the power developed at ground level up to a given height, known as the rated height. It is not however permissible, except in special circumstances, for the throttle of a supercharged engine to be opened fully on the ground as this would seriously endanger the engine. This is prevented by the supercharge control device, which consists of a chamber having its interior exposed to the charging pressure, a member, responsive to the pressure in the chamber, which acts on the linkage interconnecting the throttle valve and the pilot's throttle lever to close the valve as the altitude decreases and open it as the altitude increases, thus maintaining, for a given position of the pilot's throttle lever, a constant charging pressure independent of altitude up to the limit of the supercharger's ability to maintain the given pressure.

It is known that an engine in an aircraft climbing from ground level to the rated height will, owing to the better scavenging action arising from lower external air pressure against the exhaust, give a steady increase in horse power with increase in altitude up to the rated height, which increase in horse power can be of such an order as to impair the life of the engine.

The chief object of this invention is to enable the charging pressure to be varied automatically in accordance with flying conditions and particularly to compensate the supercharge control device for differences in power output at constant charging pressure occurring with change in altitude up to the rated height and also for differences arising from changes in speed (such as between climbing speed and high forward speed) and for differences in engine temperature. Another particular object is to produce automatically a difference in charging pressure when climbing as compared with that of level flight, especially when manoeuvring at high speed.

According to this invention a supercharge control device having in its chamber an outlet constituting an air leak for varying its controlling effect is provided with a valve for controlling the air leak operatively connected to a pressure sensitive device responsive to atmospheric pressure arranged to progressively diminish the air leak with increase in altitude.

The pressure sensitive device may be exposed at one side to the atmospheric or carburetter intake pressure (hereinafter referred to as the atmospheric pressure), and at its opposite side to the engine induction manifold, which in a supercharged engine is located on the output side of the supercharger so that the valve is operated when the pressure at one side of the device exceeds that at the opposite side by a predetermined amount.

The pressure sensitive device may comprise a diaphragm, one side of which is exposed to the charging pressure while the opposite side is exposed to an air intake, the pressure in which will increase with increase of aircraft speed, so that under flying conditions, for instance when climbing, where the charging pressure would otherwise have remained constant, but the air pressure acting on the other side of the diaphragm would decrease, the decreased pressure on one side will allow the diaphragm to move and gradually (or, if preferred, suddenly) close the air leak when the supercharge control device will immediately be adjusted to close the throttle and lower the charging pressure. In high speed flight, however, the pressure of the air intake will exceed that on the other side of the diaphragm and then the diaphragm will open the valve.

The atmospheric side of the diaphragm may be communicated directly with a forwardly facing air intake located on the aircraft. Alternatively, it may be connected with the throat of a venturi where the venturi is formed with a forwardly facing intake on the aircraft.

Where the atmospheric side is communicated directly to the forwardly facing intake, as the speed of the aircraft increases the diaphragm will tend to move away from the atmospheric side to open the valve and the effect of this will be to cause the air leak to act in a well known manner to increase the charging pressure. With the alternative arrangement, however, the effect will be reversed in that as the speed of the aircraft increases the diaphragm will tend to move towards the atmospheric side and will close the air leak to decrease the charging pressure. Either of these alternative forms can be selected according to the type of engine and the desired controlling effect.

It will be understood that instead of arranging the intakes forwardly directed into the airstream flowing over the aircraft, they may be arranged at any other place at which the air pressure will increase with increase of speed of the aircraft.

For controlling the air leak valve in accordance with differences in engine temperature known types of thermostats may be used, which are operatively connected to the valve in the air leak so as to allow the valve to remain open when the engine is cool but to close it when the temperature exceeds a predetermined value.

In addition a valve or other means is preferably provided for manually controlling the air leak valve so as to enable it to be closed, or to enable the automatic pressure operated controlling means according to this invention to be put out of action, leaving the air leak to function in its normal manner but this manual means would in general only be provided for emergency use.

The use of the air leak controlling valve does not affect the mechanism for changing the datum of the supercharge control device as described in the aforementioned prior patents, but in effect it re-sets the supercharge control device to maintain a higher charging pressure when the air leak is open than when it is closed. It can therefore be arranged for the air leak valve to be connected with the pilot's throttle lever so that the air leak is closed under cruising conditions and thus the automatic control according to this invention will only be operative under high power running conditions. As an alternative it can be arranged for a pressure operated valve to close the air leak when, as in cruising conditions, the charging pressure falls below a predetermined value.

Examples of controlling means according to this invention are illustrated by way of example in the accompanying drawings in which:

Fig. 2 is a diagram of one form of the air leak controlling means.

Fig. 4 is an enlarged view of one form of the air leak control showing mechanism for adjusting the said control.

Figure 1:
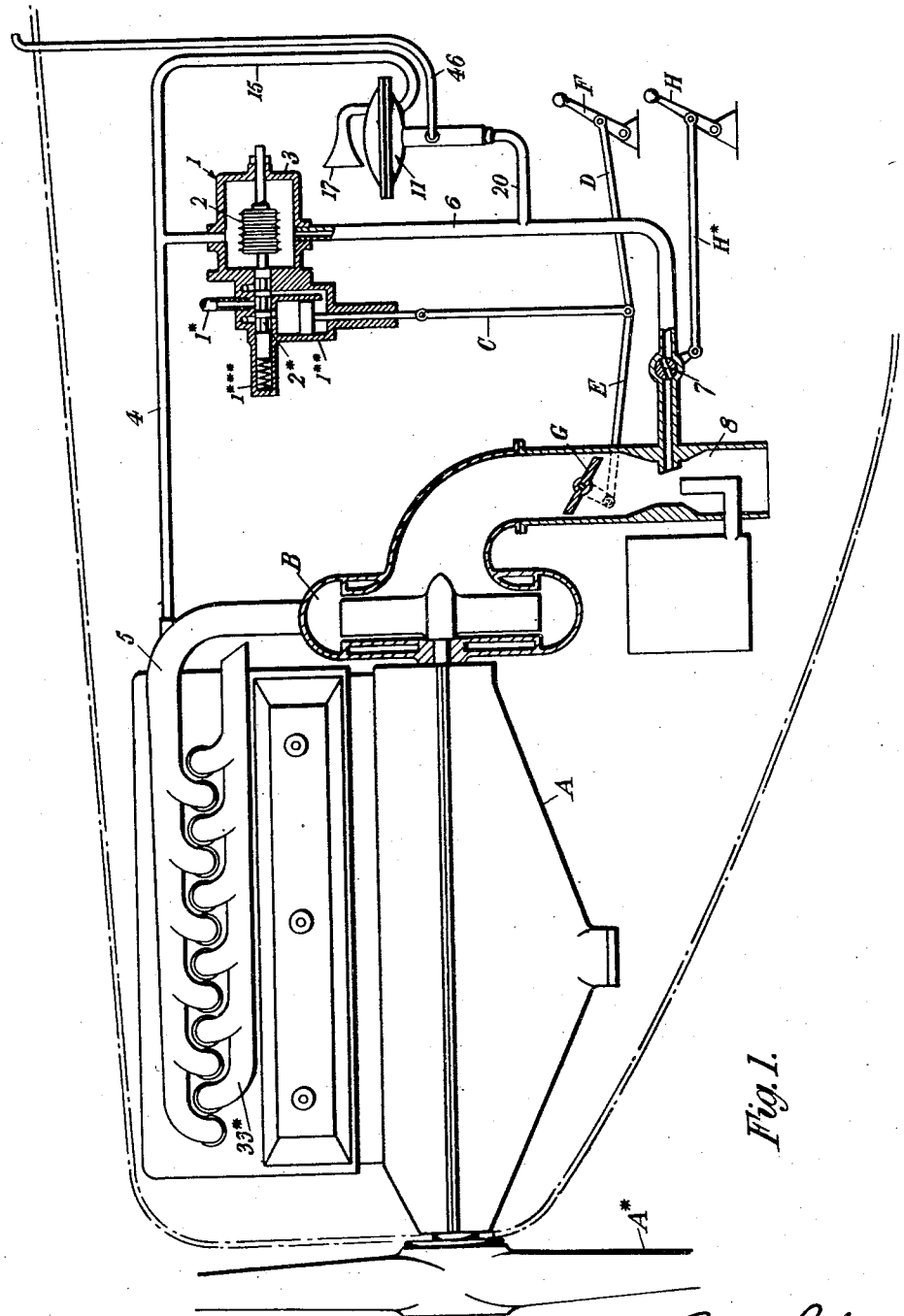
Fig. 1 is a diagram of a supercharged engine and its controlling means.

As shown in Fig. 1 the aircraft engine A is fitted with a propeller $A^x$ and with a supercharging blower B, the engine having the usual supercharge control device 1 comprising a stack of capsules 2 in a chamber 3 is connected at one side by the pipe 4 with the induction manifold 5, which connection in the case of the supercharged engine shown is on the output side of a supercharger B. The capsules 2 operate a valve $2^x$ controlling the supply of fluid pressure through pipes, only one of which is shown and marked $1^x$, to a servomotor in the casing $1^{xx}$, as described in the aforesaid United States Patent No. 1,995,800 except that as shown the capsules and valve are at right angles to the axis of the servomotor instead of being parallel. An extension $1^{xxx}$ on the casing $1^{xx}$ allows for the travel of the valve $2^x$. The servomotor is operatively connected by link C to the junction of two links D and E which serve to connect the pilot's throttle control F with the throttle valve G. The chamber 3 is connected on the opposite side of the pipe 4 by an outlet pipe 6 containing a valve 7 manually operable by the lever H through the link $H^x$, with the carburetter intake 8. The pipe 6 constitutes the air leak and it is usual as shown in Fig. 2 to fit this pipe with a venturi indicated at 9 and to fit the pipe 4 with a sharp edged orifice 10 to enable these to function in the required manner.

The means for controlling the air leak comprises a casing 11 having a diaphragm 12 so mounted in it as to divide the casing 11 into two compartments 13, 14 one of which compartments 13 is communicated through a pipe or passage 15 with the pipe 4 or any other part of the engine system containing mixture at the charging pressure while the other compartment 14 is communicated through a pipe or passage 16 with a forwardly facing intake 17 open to the atmosphere. For convenience the side of the diaphragm exposed to atmosphere is hereinafter referred to as the atmospheric side, and the side exposed to the charging pressure is referred to as the pressure side. The diaphragm 12 is suitably loaded, for instance by a spring 18 arranged on the atmospheric side and is operatively connected to a valve 19 in a branch pipe 20 from the air leak passage 6. If with this arrangement the spring 18 or other loading device holds the air leak valve off its seat at ground level, then as the aircraft climbs the decrease of air pressure on the atmospheric side of the diaphragm as compared with the pressure on the other side of the diaphragm, the diaphragm will be displaced to overcome the spring 18 and close the air leak valve 19. Where, as in the construction described with reference to Fig 2, the atmospheric side of the chamber is communicated directly to a forward facing intake, the pressure on the atmospheric side of the diaphragm will be higher at high speeds than at climbing speeds, and, consequently, the valve 19 will open at high speeds and close at climbing speeds, and the effect of this will be that when the valve 19 is open the supercharge control device acts to open the throttle and increase the pressure in the chamber in order to compensate for the leak and this results in a higher charging pressure being supplied to the engine at high speeds than when climbing. Owing to the better cooling effect obtained at higher speeds, however, the engine can stand the higher charging pressures without damage.

Figure 3:
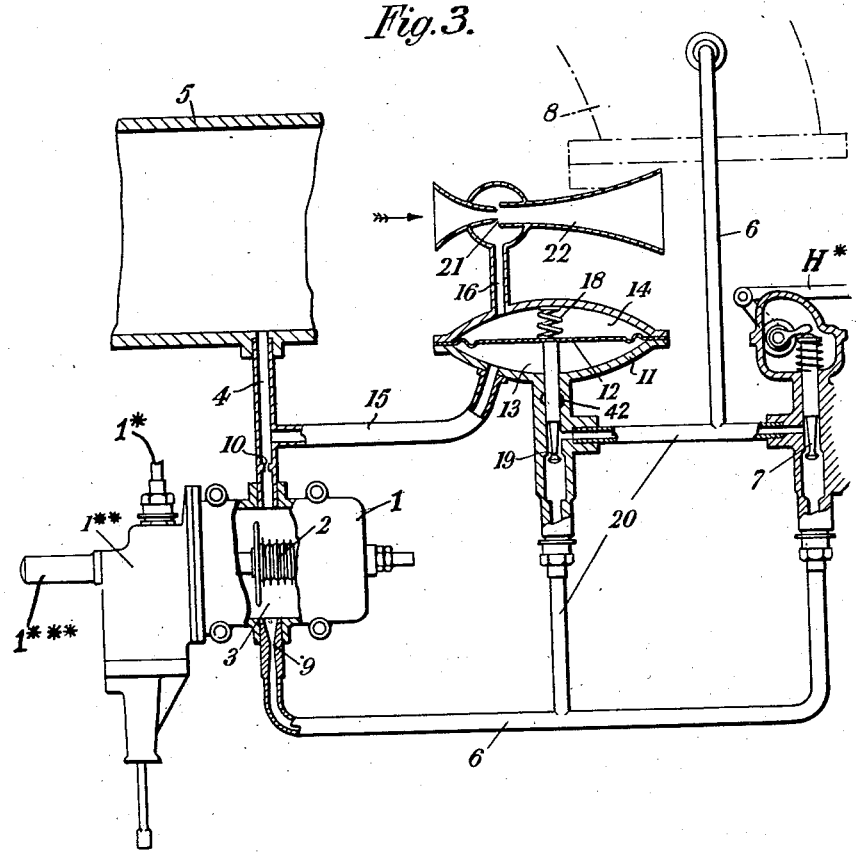
Fig. 3 is a similar view to Fig. 2 of an alternative form of air leak controlling means.

The alternative arrangement shown in Fig. 3 is similar to that shown in Fig. 2 and like parts are indicated by like references, but in Fig. 3 the pipe 16 instead of communicating directly with a forwardly facing air intake, communicates with the throat 21 of a venturi 22, which venturi has a forwardly facing air intake exposed to the atmosphere. Where, as in Fig. 3, the atmospheric side is communicated with a venturi extractor instead of directly with a forward facing intake, the pressure on the atmospheric side of the diaphragm will be less at high speeds than at the climb.

With either of these forms of control, the diaphragm 12 may be connected to the air leak valve as shown in Fig. 4, through a floating lever 23 having a fulcrum 24 carried on the end of an arm 25 which is angularly adjustable about its pivot 26, so that the fulcrum is movable within the limits of the slot 27. The floating lever 23 is connected to the diaphragm 12 and to the valve 19 at points spaced from the fulcrum 24. By adjusting the fulcrum the effect of the spring 18 acting on the diaphragm can be varied. The spring pressure may be independently adjustable by a setting screw 28. In addition, an air leak 29 may be provided in the casing 11 on the atmospheric side of the diaphragm to vary, under the control of an adjustable valve 30 for this air leak the effect of pressure at this side on the diaphragm. Alternatively the effect of the diaphragm on the air leak through the pipe 20 can be varied by adjustment of a cam operating on the spring, by replacing the valve 19 by a suitably shaped needle, or by adjustment of a disc scissor valve operating on the air leak 29.

Figure 5:
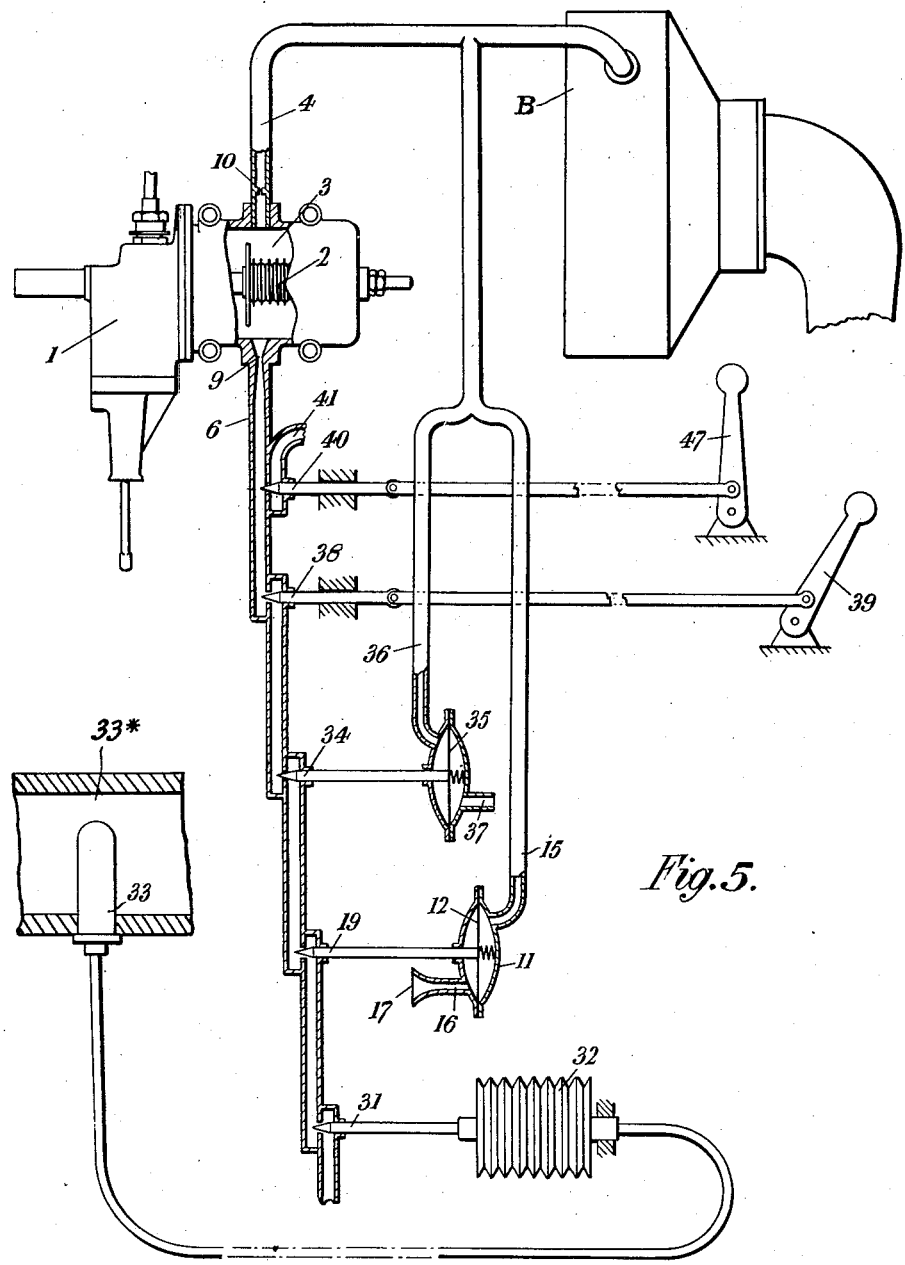
Fig. 5 is a diagram of a further form of the air leak controlling means in which a number of controlling devices are provided.

The controlling of the air leak by the various devices hereinbefore described may be carried out by a number of valves arranged, as shown in Fig. 5, in series, each acting on the air leak pipe 6. One of these valves 31 may be operatively connected to a thermostat, which would be preperably remote acting as described in United States Patent No. 2,055,280 and comprising a bellows 32 and a boiler 33 located in the engine, for instance, in the exhaust pipe 33× shown in Figs. 1 and 5. Another valve 19 may be controlled by the diaphragm 12 of the control shown in Fig. 2, hereinbefore described, adapted to compensate for change in engine power. A further valve 34 may be operatively connected to a similar diaphragm 35 exposed at one side through the pipe 36 to the charging pressure, and at the other side to atmosphere through a pipe 37 that is not forwardly facing, said valve 34 being arranged as hereinbefore described to close the air leak under cruising conditions. Alternatively this valve 34 could be connected to the pilot's throttle lever. A still further valve 38 may be operatively connected to a pilot's control 39 to enable the air leak to be shut off or the other valves controlled by automatic devices to be put into or out of action. A fifth valve 40 may be provided to enable a by-pass 41 for the air leak to be opened by an air leak emergency lever 47, so that the said air leak 6 can be opened independently of the automatic governing by any of the valves 31, 19, 34 in the case of an emergency, in which case the risk of endangering the engine would be justified.

Figure 6:
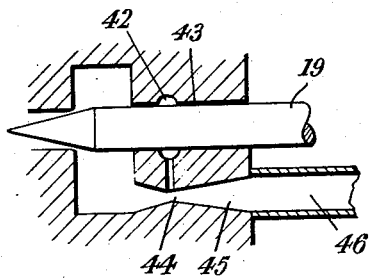
Fig. 6 is a sectional view of a detail.

The air leaking from the chamber of the supercharge control device is inflammable and it is important that it should not escape into the engine cowling or other enclosed space. It is also important, as the valves are diaphragm operated, to minimise the friction of the valves which necessitates making them a fairly loose fit in their guides but this, however, would result in leakage of air through the said guides. In order to avoid this leakage it is proposed to provide any one or all of the valves with the arrangement shown in Figs. 3 and 6, in which a gland or opening 42 in the guide 43 is communicated to the throat 44 of a venturi 45, so that the lower pressure there, as compared with that at other parts of the system, will tend to draw any leakage air into the venturi rather than allow it to escape through the valve guide. This leakage air can then be discharged through a pipe 46 Figs. 1 and 6 communicating with the venturi 45 into the air surrounding the aircraft.

Where a thermostat control for the valve is provided this may be made responsive to the engine cylinder, blower or atmospheric temperature.

A control according to this invention enables the controlling effect of the supercharge control device to be so modified by the actual operating condition of flight as to tend to maintain the power constant between ground level and the rated height.

Although the invention has been particularly described as applied to a valve operated by a diaphragm, it will be understood that it may be operated by a barometric capsule, or by a stack or pile of such capsules, or by bellows or by any other pressure sensitive device.

What I claim as my invention and desire to secure by Letters Patent is:

1. In a supercharged aircraft engine, the combination with a supercharge control device comprising a chamber having its interior exposed to the charging pressure, a member responsive to the pressure in the chamber for varying the position of the throttle valve so as to maintain, for a given position of the pilot's throttle lever, a constant charging pressure independent of altitude and an outlet from said chamber constituting an air leak, of a valve for controlling the air leak, a pressure sensitive device responsive to atmospheric pressure, and an operative connection between the pressure sensitive device and the valve arranged to actuate the valve in the sense to diminish the air leak with increase in altitude.

2. In a supercharged aircraft engine, the combination with a supercharge control device comprising a chamber having its interior exposed to the charging pressure, a member responsive to the pressure in the chamber for varying the position of the throttle valve so as to maintain, for a given position of the pilot's throttle lever, a constant charging pressure independent of altitude and an outlet from said chamber constituting an air leak, of a valve for controlling the air leak, a pressure sensitive device having one of its sides exposed to atmosphere and its other side exposed to the charging pressure, and an operative connection between the pressure sensitive device and the valve arranged to actuate the valve in the sense to diminish the air leak with increase in altitude.

3. In a supercharged aircraft engine, the combination with a supercharge control device comprising a chamber having its interior exposed to the charging pressure, a member responsive to the pressure in the chamber for varying the position of the throttle valve so as to maintain, for a given position of the pilot's throttle lever, a constant charging pressure independent of altitude and an outlet from said chamber constituting an air leak, of a valve for controlling the air leak, a forwardly facing air intake, a pressure sensitive device having one of its sides in communication with said air intake, and the other exposed to the charging pressure, and an operative connection between the pressure sensitive device and the valve arranged to actuate the valve in the sense to diminish the air leak with decrease in pressure in the air intake.

4. In a supercharged aircraft engine, the combination with a supercharge control device comprising a chamber having its interior exposed to the charging pressure, a member responsive to the pressure in the chamber for varying the position of the throttle valve so as to maintain, for a given position of the pilot's throttle lever, a constant charging pressure independent of altitude and an outlet from said chamber constituting an air leak, of a valve for controlling the air leak, a Venturi-extractor exposed to the airflow, a pressure sensitive device having one of its sides in communication with the throat of the venturi and the other exposed to the charging pressure, and an operative connection between the pressure sensitive device and the valve arranged to actuate the valve in the sense to diminish the air leak with decrease in pressure in the venturi.

5. In a supercharged aircraft engine, the combination with a supercharge control device comprising a chamber having its interior exposed to the charging pressure, a member responsive to the pressure in the chamber for varying the position of the throttle valve so as to maintain, for a given position of the pilot's throttle lever, a constant charging pressure independent of altitude and an outlet from said chamber constituting an air leak, of a valve for controlling the air leak, a pressure sensitive device responsive to atmospheric pressure, an operative connection between the pressure sensitive device and the valve arranged to actuate the valve in the sense to diminish the air leak with increase in altitude, and manually operable means for closing the air leak for the purpose of rendering inoperative the said valve and the pressure sensitive device for controlling it.

6. In a supercharged aircraft engine, the combination with a supercharge control device comprising a chamber having its interior exposed to the charging pressure, a member responsive to the pressure in the chamber for varying the position of the throttle valve so as to maintain, for a given position of the pilot's throttle lever, a constant charging pressure independent of altitude and an outlet from said chamber constituting an air leak, of a valve for controlling the air leak, a pressure sensitive device responsive to atmospheric pressure, an operative connection between the pressure sensitive device and the valve arranged to actuate the valve in the sense to diminish the air leak with increase in altitude, a further valve in the air leak, and means for operating said further valve to close the air leak under cruising conditions of the engine.

7. In a supercharged aircraft engine, the combination with a supercharge control device comprising a chamber having its interior exposed to the charging pressure, a member responsive to the pressure in the chamber for varying the position of the throttle valve so as to maintain, for a given position of the pilot's throttle lever, a constant charging pressure independent of altitude and an outlet from said chamber constituting an air leak, of a valve for controlling the air leak, a pressure sensitive device responsive to atmospheric pressure, and an operative connection between the pressure sensitive device and the valve arranged to actuate the valve in the sense to diminish the air leak with increase in altitude, said operative connection being adjustable and including a floating lever having a movable fulcrum, which lever is connected to the pressure sensitive device and to the valve at points spaced from the fulcrum.

8. In a supercharged aircraft engine, the combination with a supercharge control device comprising a chamber having its interior exposed to the charging pressure, a member responsive to the pressure in the chamber for varying the position of the throttle valve so as to maintain, for a given position of the pilot's throttle lever, a constant charging pressure independent of altitude and an outlet from said chamber constituting an air leak, of a valve for controlling the air leak, a pressure sensitive device responsive to atmospheric pressure, an operative connection between the pressure sensitive device and the valve arranged to actuate the valve in the sense to diminish the air leak with increase in altitude, and means for extracting air leaking past said valve and discharging it to the exterior of the aircraft.

EDWARD DODSON.